United States Patent [19]
Breton et al.

[11] Patent Number: 6,008,905
[45] Date of Patent: Dec. 28, 1999

[54] METHOD AND APPARATUS FOR DETERMINING THE APPEARANCE OF AN OBJECT

[75] Inventors: Pierre Breton, Montréal; Louis Drolet, Sherbrooke; Thomas Jelonek, Montréal, all of Canada; Donald Griffin Koch, Burbank, Calif.; Pierre-Jules Tremblay; Peter Whaite, both of Montréal, Canada

[73] Assignee: Deus Ex Machina Inc., Montreal, Canada

[21] Appl. No.: 09/219,132

[22] Filed: Dec. 22, 1998

[51] Int. Cl.⁶ ........................................... G01J 3/51
[52] U.S. Cl. .................. 356/402; 356/405; 356/407; 356/425; 433/26; 433/203.1
[58] Field of Search ..................... 356/402, 405, 356/406, 407, 416, 418, 419, 425; 250/226; 348/66, 70, 77; 433/26, 29, 203.1

[56] References Cited

U.S. PATENT DOCUMENTS

| | | |
|---|---|---|
| 3,802,783 | 4/1974 | Simmonds et al. . |
| 3,929,398 | 12/1975 | Bates . |
| 3,986,777 | 10/1976 | Roll . |
| 4,096,217 | 6/1978 | Roll . |
| 4,241,738 | 12/1980 | Lubbers et al. . |
| 4,654,794 | 3/1987 | O'Brien . |
| 4,678,338 | 7/1987 | Kitta et al. ............................... 356/402 |
| 4,836,674 | 6/1989 | Lequime et al. ......................... 356/319 |
| 4,881,811 | 11/1989 | O'Brien .................................... 356/323 |
| 5,177,694 | 1/1993 | Graham et al. .......................... 356/421 |
| 5,383,020 | 1/1995 | Vieillefosse ............................. 356/326 |
| 5,428,450 | 6/1995 | Vieillefosse et al. ................... 356/405 |
| 5,477,332 | 12/1995 | Stone et al. ............................. 356/371 |
| 5,493,404 | 2/1996 | Allaire et al. ........................... 356/402 |
| 5,745,229 | 4/1998 | Jung et al. ................................ 356/73 |
| 5,759,030 | 6/1998 | Jung et al. ................................ 433/29 |
| 5,766,006 | 6/1998 | Murljacic ................................. 433/26 |

FOREIGN PATENT DOCUMENTS

| | | |
|---|---|---|
| 0 367 647 | 12/1989 | European Pat. Off. . |
| 2 669 526 | 11/1990 | France . |
| WO 86/03292 | 6/1986 | WIPO . |

*Primary Examiner*—F. L. Evans
*Attorney, Agent, or Firm*—Ryan Kromholz & Manion, S.C.

[57] ABSTRACT

A method for determining the appearance of an object to be replicated and an apparatus therefor are described herein. The method consists in providing a controlled illumination to illuminate a surface of the object, measuring the object with a CCD camera to collect an image map of a plurality of points on the surface and processing that information to produce an appearance mapping of the object. Calibration of the apparatus is done by measuring calibration patches illuminated with the same illumination. When the apparatus is made in view of replicating the appearance of an object, a comparison can be done by similarly producing an appearance mapping of the replicate and by comparing it to the appearance mapping of the object.

33 Claims, 5 Drawing Sheets

METHOD AND APPARATUS FOR DETERMINING THE APPEARANCE OF AN OBJECT

FIELD OF THE INVENTION

The present invention relates to methods and apparatuses for characterization of an object. More specifically, the present invention is concerned with such a method and apparatus for determining the appearance of an object such as, for example, a tooth.

BACKGROUND OF THE INVENTION

The task of replacing a tooth is conventionally made of two separate steps. The first step is to measure the shape and color shade of a tooth to be replaced and the second step is to make a duplicate of that tooth according to the measurements taken in the first step.

In the first step, while the shape information can be acquired with molding technique, the measurement of the color shade and translucency of the tooth proves to be more challenging.

The quality of the dental prosthesis cannot be better than the data that serves to model the tooth. The precision of that model depends on several factors, like the quality of the illumination, the data acquisition by measuring and the processing of those data.

The oldest and simplest way of determining the color shade of an object like a tooth is to compare visually the object with a chart of color shades. The results obtained with that method are however not very good because of the subjectivity of the human eye. Furthermore, the illumination of the tooth and of the chart may cause inappropriate color shade choices.

A quantitative method can be used to obtain a minimum of precision and of reproductability in the measurement of the color shade of an object. Such quantitative methods can be classified by the type of illumination used, the measurement technique, the data processing and the comparison between the finished product and the original object.

The illumination is usually done by using fiber optics or a fiber optic bundle to illuminate the surface of the object to be measured. It is advantageous to control the illumination of the object since the characteristics of the illumination method may be taken into account during the data processing. Diffuse light provides a simple means to control illumination. An example can be found in the U.S. Pat. No. 5,383,020 issued in Jan. 17, 1995 and naming Vieillefosse as the inventor.

Integrating spheres are a known technique to achieve a uniform diffuse light source. Such a technique of illuminating a tooth is described by O'Brien in the U.S. Pat. No. 5,759,030, issued on Nov. 21, 1989. This type of illumination is useful for measurement of matte surfaces. A drawback of that technique, or of any other technique that produces diffuse light, is apparent when it is used to illuminate glossy material. The desired signal is then confounded with a specular reflection component. The classification of tooth shades requires that the illumination be known with a precision of at least one percent everywhere on the tooth surface.

Different measurement techniques are presently used to quantize the reflected light coming from an illuminated object. These techniques usually consist in a spectral decomposition of the reflected light from a selected area of the object surface.

Vieillefosse et al. describe, in U.S. Pat. No. 5,428,450, issued on Jun. 27, 1995, a method for determining the color of an object by decomposing the light with an optical system consisting of achromatic doublets and by analysing the light by means of interference filters and photo detectors. In the above mentioned O'Brien's patent, there is described a device for decomposing the light, comprising a spectrophotometer.

A drawback of both Vieillefosse et al. and O'Brien's methods is that the selected area of the object surface is seen as if it was uniform or a point. The spatial differences are not detected by these methods and thus can not be reproduced in the duplicated teeth. Another drawback of Viellefosse's method is that the wavelength spectrum is limited to only five wavelengths.

Another measurement technique is taught by Murljacic in his U.S. Pat. No. 5,766,006, issued on Jun. 16, 1998. In this document, Murljacic describes a tooth shade analyser system using a camera to capture a digital color image of a tooth. The tooth image includes an RGB chromaticity representation that is scanned and compared pixel by pixel with several tooth shades stored in a memory of the system.

A drawback of Murljacic's system is that the scanning is performed without controlling the illumination therefore decreasing the reproductability of the color comparison.

Several methods are known and used to convert the spectral decomposition or the data collected from a selected area into a single measurement that corresponds to the color perception of the human eye. The objective is to quantize the data and also to correct them as to be able to recreate the proper colors of the original model as the human eye perceives them. It is also important to be able to quantize the translucency of the materials.

A method of processing data is described by O'Brien. It consists in converting the measurements to tristimulus values, after calibration on a chip, and comparing to known tabulated values. The tristimulus value conversions are performed under a given illumination, represented by tabulated values determined to represent most appropriately power frequency distribution of an incandescent lamp. A problem of that method is that it does not process images obtained by a properly color-calibrated measurement device.

A general drawback of the prior art lies in that the notion of comparison between the measured tooth and a duplicate is limited to a single point to point comparison. Thus, area defects cannot be detected where no measurement has been taken.

OBJECTS OF THE INVENTION

An object of the present invention is therefore to provide an improved method and apparatus for determining the appearance of an object.

SUMMARY OF THE INVENTION

More specifically, in accordance with the present invention, there is provided a method for determining the appearance of an object comprising the steps of:

illuminating a surface of the object with a controlled illumination;

collecting, with a camera, color shade data corresponding to light rays reflected from a predetermined plurality of points on the illuminated surface of the object; and processing the color shade data to create at least one appearance map of the object.

According to another aspect of the present invention, there is provided an apparatus for determining the color of an object, the apparatus comprising;

an illuminator assembly to produce a controlled illumination onto a surface of the object; the illuminator assembly including at least one light generating source and at least one illumination path between the at least one light source and the object to project the generated light on the object;

a camera to collect light reflected from a plurality of points on the surface of the illuminated object; said camera producing a first set of data consisting of a spectral image map of the illuminated surface of the object;

a controller to control the at least one light source and the camera and to process the first set of data to create at least one appearance map of the illuminated surface of the object.

Other objects, advantages and features of the present invention will become more apparent upon reading of the following non restrictive description of preferred embodiments thereof, given by way of example only with reference to the accompanying drawings.

DESCRIPTION OF THE PREFERRED EMBODIMENT

Figure 1:
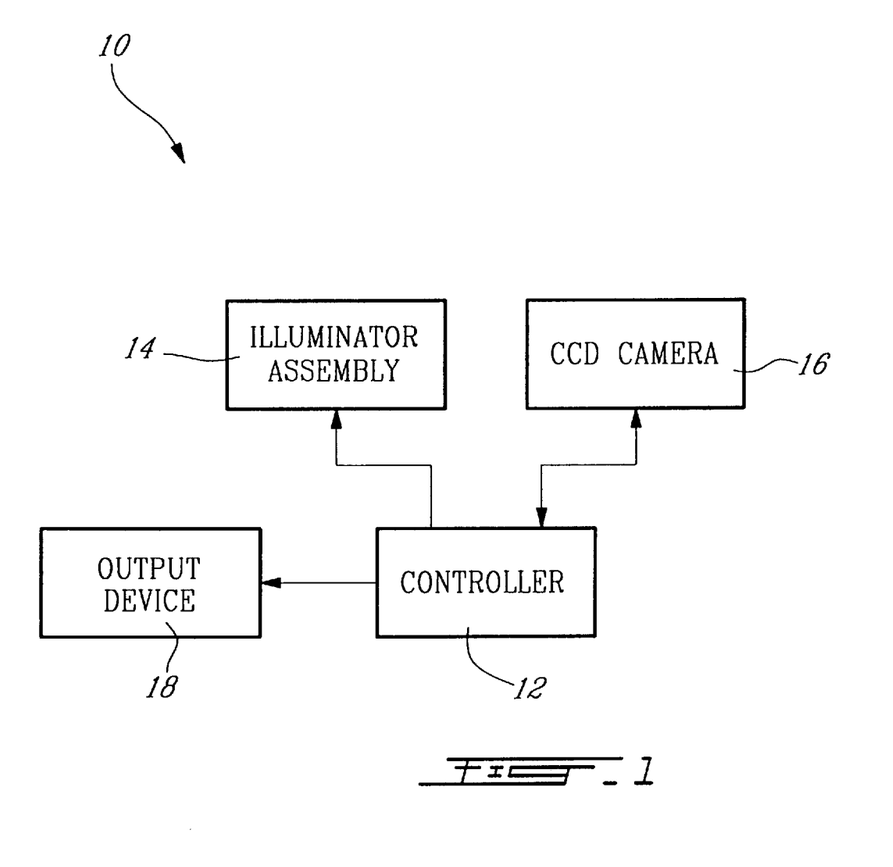
FIG. 1 is a block diagram of an appearance determination apparatus according to an embodiment of the present invention.
Figure 2:
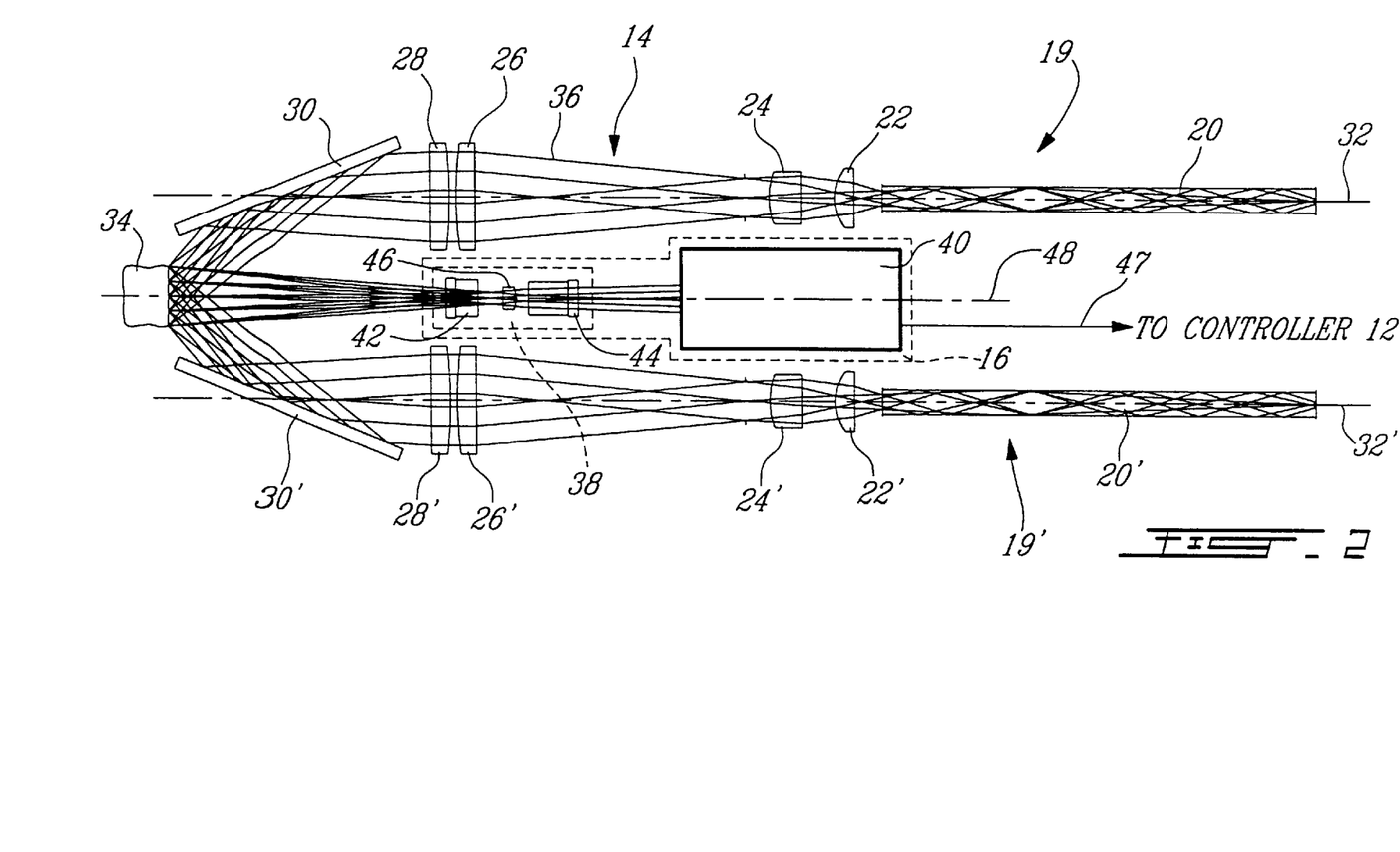
FIG. 2 is a schematic view of the illuminator assembly and of the CCD camera of the apparatus of FIG. 1.

Referring now to FIGS. 1 and 2, an apparatus 10 for measuring the appearance of an object, according to a preferred embodiment of the present invention, will be described.

It is to be noted that the appearance of an object is determined by a number of factors: color, translucency, gloss, texture, etc.

The apparatus 10 comprises a controller in the form of a computer 12, an illuminator assembly 14, a CCD (Charged Coupled Device) camera 16 and an output device 18.

The illuminator assembly 14 includes light sources (not shown) and two illumination paths 19, 19'. Each illumination path 19, 19' includes respective square glass integrator rods 20, 20', optical lenses 22, 22'; 24, 24'; 26, 26' and 28, 28', and flat front surface mirrors 30, 30'.

In a preferred embodiment, the integrator rods 20, 20' are made of solid glass known as BK7, manufactured by Schott and have a square cross-section of 3.2 by 3.2 mm. They are 70.0 mm long. The lenses 22, 22' are made by Melles-Griot under part number 01 LPX 009. The lenses 24, 24' are made by Melles-Griot under part number 01 LDX 025, edged to a width of 8 mm. Lenses 26, 26' and 28, 28' are made by Melles-Griot under respective part number 01 LDX 167 and LPX 177, both edged to a width of 17.4 mm. The edging of the lenses 24, 24'; 26, 26' and 28,28' is advantageous since it reduces the width of the illuminator assembly. The dimensions of the reflective surface of the mirrors 30, 30' are 32.0 mm by 20.0 mm. The thickness of each mirrors 30, 32 is 2.0 mm. Of course, thicker mirrors could be used. Similarly, the make and part number of the different elements forming the illumination paths 19 and 19' have been given hereinabove as a non-limitating example only.

As can be seen in FIG. 2, each of integrator rods 20, 20' and of lenses 22, 22'; 24, 24'; 26, 26' and 28, 28' are centered about respective optical axes 32, 32'. The mirrors 30, 30' are angled and positioned as to reflect on the surfaces of a tooth 34 the light coming from the light sources and passing through the above mentioned elements forming the illumination paths 19 and 19'. The light rays are schematically represented by lines 36 in FIG. 2.

Of course, the relative position of the various elements of the illuminator assembly 14 are maintained through an adequate support and various conventional securing devices.

The various elements of the illuminator 14 are so positioned as to create, with the light sources (not shown), a telecentric light source and to avoid as much as possible specular reflections, hence the splitting in two of the illuminator 14 and the angle in the mirrors 30 and 30'. Of course, as will be described hereinbelow, other controlled light sources could be used.

It is to be noted that the integrator rods 20 and 20' advantageously receive light from a light source through fiber optic cables (not shown).

The CCD camera 16 includes a camera objective 38 and a camera head 40. The camera objective 38 includes lenses 42 and 44 and a filter 46.

It is to be noted that the camera 16 can be any input device that can detect appearance and transfer the information to the computer 12.

The output device 18 can be anything from devices to display the measurements or the results such as a display monitor, a frame grabber, a printer or a fax, to devices to store the information such as a computer memory, a disk drive, a CD-drive, etc.

The output device 18 can also be a molding apparatus configured to receive the data after processing.

In a preferred embodiment, the lenses 42 and 44 are made by Melles-Griot under respective part numbers 01 LAO 047 and LAO 014 and are both edged to a diameter convenient for mounting and clearing the illuminator assembly 14. The filter 46 is a neutral density filter made by Melles-Griot under part number 01 FNG type. The diameter is 12.5 mm and does not require edging. Minimum clear aperture is 2.70 mm. The filter 46 and the lenses 42 and 44 are centered on an optical axis 48 of the CCD camera 16. Of course, the make and part number of the different elements forming the camera objective 28 have been given hereinabove as a non-limitating example only.

The camera head 40 includes standard components to receive the light coming from the tooth surface 34 and to digitize this data. Those components are believed well known in the art and will not be further explained herein. Of course, the camera head 40 includes data cables 47 to transmit to the controller 12, the signal produced by the camera head 40.

As mentioned hereinabove, the controller is in the form of a general purpose computer 12 including a CPU (Central Processing Unit), provided with an output device 18 and other peripherals (not shown) such as, for example, a keyboard, a printer and a frame grabber to which the CCD camera 16 may be connected. The general purpose computer 12 runs a software program designed to control the CCD camera 16 and the illuminator assembly 14 so as to acquire and thereafter process image data as will be described hereinbelow.

Figure 3:
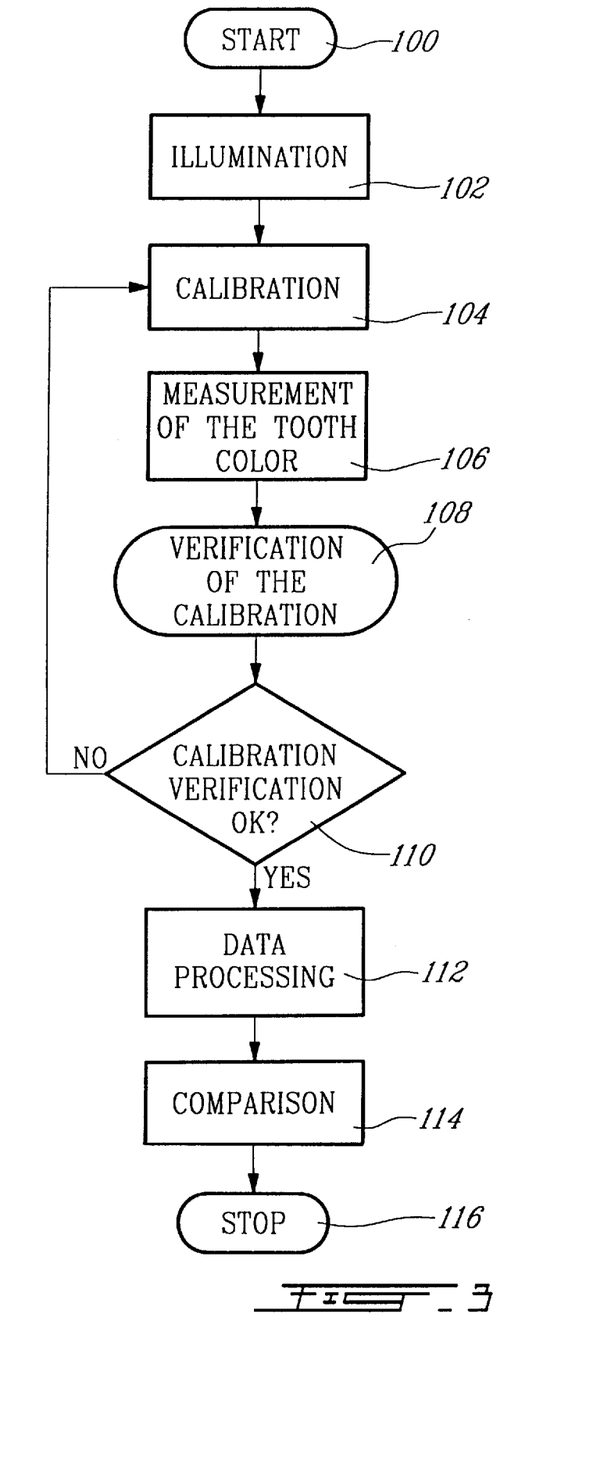
FIG. 3 is a simplified block diagram of a method of appearance determination according to an embodiment of the present invention.

Turning now to FIG. 3 of the appended drawings, the method of measurement of the color shade and the translucency of a tooth, according to an aspect of the present invention will be described.

Generally stated, the method of the present invention consists in performing the following steps in sequence:

100—starting the apparatus;

102—illuminating the tooth via a predetermined illumination method;

104—calibrating the CCD camera;

106—acquiring data pertaining to the color shade and translucency of the tooth;

108—optionally, verifying that the initial calibration is correct; if not (step 110), returning to step 104;

112—processing the data to produce a color shade image map and a translucency image map;

114—optionally, after a duplicate tooth has been made from the data of the color shade and translucency image maps, the image of the duplicate tooth may be acquired by placing the duplicate tooth in place of the original tooth and by performing steps 1 to 5 to yield duplicate color shade image and translucency image maps that may be compared to the original maps to control the quality of the finished product; and 116—stopping the apparatus.

These general steps will now be further described.

Illumination

The purpose of the illumination step 102 is obviously to illuminate the object to measure, i.e., the tooth 34 (FIG. 2). As will be further described hereinbelow, the data acquisition step requires that the illumination is known with a precision of at least one percent everywhere on the tooth surface. A telecentric configuration, as shown, for example, in FIG. 2, meets the specifications for dental applications. The light sources projecting light rays in the square glass integrator rods 20, 20' must be powerful enough to drown other ambient light sources to thereby ensure that the characteristics of the illumination of the tooth are known.

Calibration

Measurement of the color and translucency of a tooth depends critically on the illumination and sensor characteristics at the time the measurement is made. The step 104 is the calibration of these factors by taking measurements of a first calibration target (not shown) consisting of a collection of patches of known color shades, translucencies, and other appearance factors. From these measurements, the controller 12 infers a mathematical transform that will convert the measured values into standard ones.

The illumination characteristics can vary in time. Since the timescale of the variation is longer than the time needed to take the measurement, taking a measurement of the characteristics of the first calibration target immediately prior to the measurement of the color and translucency of the tooth will generally suffice to calibrate the apparatus 10.

However, a supplemental calibration step (step 108) may be done after the data acquisition step 106 to verify that the characteristics of the illumination has not changed during the data acquisition.

Calibration measurements can be taken automatically, while the apparatus 10 is at rest in its holster (not shown).

The controller 12 time stamps the calibration measurements to make sure that the calibration is current.

Since the color is measured at every point on the surface of the tooth, it is important to know the illumination and sensor characteristics at every point. To achieve this, the calibration step 104 also includes a spatial correction substep where the color of a second calibration target (not shown) having a uniform color is measured. Every point can then be corrected for spatial variation by the controller 12 that computes the parameters of a mathematical spatial correction function that compensates for the variation of color acquired from the uniform calibration target. Each measured point value is then multiplied by the correction factor obtained by evaluating the correction function at the corresponding point.

Alternatively, a spatial correction function may be computed by the controller 12 by dividing each measured point value by the corresponding point value taken from a stored image of the uniform calibration target.

Every calibration target is measured beforehand to yield a distinct calibration patch. The standard values obtained from those measurements can either be stored in the controller 12 memory or programmed via a software program, used to perform the calibration step. Preferably, a bar code, containing the serial number of each calibration target is placed at a visible and known position on its surface to therefore ensure that the proper calibration patch is used to perform the calibration step 104.

The calibration patches can also be used to perform periodic, time-stamped, measurements of the calibration target, that allows to monitor and diagnose the performance of the apparatus 10 over time.

It is also possible to combine spatial and temporal calibration. Indeed, calibration with respect to spatial and temporal variation can be achieved by designing a third calibration target (not shown) consisting of a collection of known patches of different appearance placed on a known uniform background target. Computer vision segmentation algorithms can use statistical classification techniques and geometrical methods to automatically separate pixels into the appearance patches, and the uniform background. A mathematical function can then be lifted to the background pixels to characterize the spatial variation. The function must be chosen to smoothly interpolate across the "holes" in the background image caused by the missing appearance patches.

After the calibration step 104, the tooth to be duplicated can be measured (step 106). This measurement step may also be called the data acquisition step. The objective of the measurement step 106 is to acquire data to build a color shade image map and a translucency image map in the data-processing step 110. For each of these, an image position registry provides the mean to couple several spectral images.

Data Acquisition

We will now describe three methods to acquire the required data to build the image maps.

Data Acquisition Method Number 1: Wavelength Scanning

Generally stated, the first data acquisition method consists in taking images of the tooth 34 using different wavelength illuminations.

A known time varying monochromatic light, coming from the illuminator assembly 14 via the illumination paths 19 and 19' illuminates the surface of the tooth 34. The reflection of the light on the surface of the tooth 34 is projected on a CCD camera 16. A series of measurements are made imaging the entire object as the wavelength is swept across the full visible spectrum. The acquisition speed of the frame grabber data acquisition card of the controller 12 and the speed of the wavelength sweeping determine the spectral resolution. A spectral map is built providing a complete spectral decomposition of every point in the image.

In practice, a full spectra can never be obtained and then can only be sampled through a finite number of spectral bands. For practical purposes a sampling every 10 nm by a band of width 10 nm over the range of wavelengths of visible light (400 nm to 700 nm) is adequate for the present application.

It is generally known that the color determined from spectra sampled more coarsely (at intervals greater than 10 nm) will not be unique in that it is possible for two different colors to generate exactly the same spectra.

The present process makes use of the fact that, for many substances, in particular for teeth, the absorption curves are smooth, and of very similar shapes. This process allows to measure small differences in color with a very coarsely sampled spectra.

Data Acquisition Method Number 2: Line Scanning

As will be evident from the foregoing description, the CCD camera (not shown) used to acquire image when the line scanning data acquisition method is used, is different from the CCD camera 16 illustrated in FIG. 2. Indeed, this CCD camera includes two CCD arrays, a splitter and a spectral decomposition element such as, for example, a prism or a diffraction grating.

In the line scanning data acquisition method, a controlled white light illuminates the visible part of the tooth. The reflected light is split and projected on the two CCD arrays: the first CCD array simply images the object, the second CCD array images the spectral decomposition of a line of light extracted from the middle of this image. If we name the two orthogonal axes of the second CCD array, X and Y, and consider the line of light to be aligned with the Y-axis, then, the spectrum of this line of light will be spread on the X-axis of the second CCD array.

The two series of successive images are acquired as the measuring probe sweeps the object. The acquisition speed of the frame grabber and the speed of the sweeping movement determine the spatial resolution. First, a position registry is built from the images of the objects. Then, a spectral map is built providing a complete spectral decomposition of every point swept by the probe.

It is to be noted that the line scanning data acquisition method provides both high spectral and spatial resolutions, a high spatial resolution in the axis perpendicular to the scan direction. However, there is a tradeoff between the spatial resolution in the scan direction and temporal resolution. If the need arises, a beam of white light can be concentrated on a line to drown ambient light fluctuation.

Data Acquisition Method Number 3: Spatial Filtered Sampling

In the spatial filtered sampling data acquisition method, a controlled white light illuminates the target. The reflected light is projected on a CCD array. A structured filter samples the spectral space differently for adjacent photosensitive elements of the CCD array. A measurement is made by imaging the target. The wavelength sampling determines both the spatial and spectral resolution. A spectral map is built providing a sampled spectral decomposition of every point in the image.

The spatially filtered sampling provides a high temporal resolution and there is a tradeoff between spatial resolution and spectral resolution. This method is ideal for relatively uniform targets with monotonous spectral curves.

Calibration Verification (optional)

After the data acquisition step 106, but before the processing of the measured data (step 112), the calibration is optionally verified (step 108) to make sure that there is no major change in the illumination. If there are significant changes, then the method returns to the calibration step 104. If not, the controller begins to process the collected data (step 112).

Data Processing

In the data processing step 112, the controller performs the following operations: color analysis, shade classification, translucency determination and appearance description.

Color Analysis

The color analysis consists in doing a tristimulus calculation. Such a calculation of the so called X, Y and Z tristimulus values are believed well known in the art and will not be described herein. The human perception of color is limited by the fact that the retina samples light through three spectral bands, the tristimulus values. These and the CIE LAB colors are normally computed from full spectra using CIE (Commission Internationale de l'Éclairage) prescribed methods.

The conventional CIE prescribed method needs a full reflectance spectrum and is then very consuming in CPU time. An advantage of the present method is to use a linear transform to compute the tristimulus values from only three samples of the spectra. The CIE color of teeth can be accurately measured using the 3 sampling bands provided by the red, green and blue channels of the CCD camera 16. It has been found that under certain mathematical criteria, relating to the range of spectra to be measured, the spectra of the X, Y and Z tristimulus computations, and the spectra of the sampling bands, it is possible to compute the tristimulus values directly from the sampling band values using a linear transform.

For example, giving $x=(X, Y, Z)^T$, a vector of tristimulus values computed from the reflectance spectra of some object, and $r=(r, g, b)^T$ is a vector of red, green and blue values as measured by the CCD camera 16 under exactly the same illumination conditions, then there are circumstances in which the two quantities will be related by some non-linear vector function g, such as $$x = g(r) \tag{1}$$

where the exact form of g is determined by the characteristics of the CCD camera 16, and the position of the illumination.

The relationship can be formulated in terms of a Taylor series expansion about some $r_0$ near the center of the color range to be measured to give $$x = g(r_0) + G(r-r_0) + (r-r_0)^T H (r-r_0) + \ldots \text{ high order terms } \ldots, \tag{2}$$

where G and H are constant 3×3 matrices computed from the value of g(r) and its derivatives at $r=r_0$. The value of the matrices is therefore a function of the camera 16 characteristics and the illumination, and will remain constant provided that these characteristics do not change.

The further simplification $$x = x_0 + G(r-r_0) \tag{3}$$

where $x_0 = g(r_0)$, can be used to convert CCD camera values to CIE tristimulus values, providing the following conditions are met:

1. The range of colors $(r-r_0)$ to be measured is small enough to cause the high order terms and the second order term containing H to become insignificant; and 2. That the constant values of the matrix G and the vector $x_0$ can be determined.

The values of G and $x_0$ can be obtained through measurement. The CCD camera 16 is used to capture N color vector values $\{r_1, \ldots, r_N\}$ from N color samples for which the corresponding tristimulus measurements $\{x_1, \ldots, x\}_V$ are known. Standard linear regression techniques can then be applied to the sets of data to obtain the required values.

There are 9 unknown numbers in the 3×3 matrix G, and 3 unknown numbers in the vector $x_0$. In order to estimate the 12 unknown numbers, then a minimum of 12 measurements are required. Each measurement of color sample yields 3 numbers, so a minimum of 4 known color samples are required. Additional color samples improve the quality of the estimate, and provide means to check the validity of the assumption that the second and higher order terms in Equation 2 are negligible.

If the second and higher order terms in Equation 2 are significant then the measurement of additional color samples can be used to estimate the 9 numbers in the 3×3 matrix H, and to use it to remove errors due to second order terms. A minimum of an additional 3 color samples would be required.

Using Equation 3 to compute tristimulus values from camera values requires 9 multiplications and 9 additions. A second order approximation from Equation 2 would need 18 multiplications and 15 additions.

Computing tristimulus values using CIE prescribed methods from a spectra sampled every 10 nm in the range 380 nm to 770 nm requires at least 120 multiplications and 120 additions.

Multiplication usually dominates the time expended on numerical computations, so the linear approximation is over 13 times as fast as the CIE prescribed methods. The second order approximation is 6 times faster.

The parameters of the linear transform are derived during the calibration from the known CIE LAB colors of the appearance patches described hereinabove.

With the method described hereinabove, it is possible to measure CIE LAB color at every pixel of the CCD camera image both because the computation is fast and because the linear transform is of low computation complexity.

It is to be noted that the method of the present invention is not limited to teeth, and can be used in any situation where the range of spectra to be measured can be approximated by a linear combination of the spectra sampling bands of the red, green and blue channels of the color CCD camera 16.

Shade Classification (optional)

Since the dental industry does not use the CIE LAB color to communicate tooth color, but a color shade guide provided by the manufacturers of the ceramic powders used to manufacture dental prosthesis, the CIE lab color results must be further processed.

The advantage of using CIE lab color values is that colors will be classified according to the human perception of color closeness.

Shade guides consist of a number of ceramic tabs, each made from a different ceramic powder, and each of a slightly different color. Using the illuminator assembly 14 and the CCD camera 16, an image of each tab is captured prior to the use of the present invention to measure the color of an object. Pixel color values are sampled from a rectangular area in the center of the image of each shade tab, and are stored and indexed in the controller 12 memory. Once all the tabs have been sampled in this manner, these samples are assembled as a shade table that is saved by the controller for later use.

The color in the shade tabs is not completely uniform because of variations due to the surface texture, the crystalline nature of the ceramic, and to inhomogeneities in the firing process. For this reason, the shade guide colors are sampled from a rectangular region, and not from a single point location. Having a large sample of the color values allows the variation in color of each of the tabs in the shade guide to be statistically quantified.

Once the shade table has been constructed, every pixel measured by the CCD camera 16 can be compared to colors of the shade guide. A weighted mean is done of the pixel value and of the values of the surrounding pixels. The central pixel is then classified as the color of the shade guide having the closest color to the mean.

Classification can be made faster by pre-computing a shade lookup table. The lookup table is created as a tridimensional array which can be indexed by discrete color values. Once the look-up table is created, any pixel color value can be quickly classified by discretizing it in the same way as the table, then using the discretized value to index into the table and retrieve the associated shade.

The look-up table needs only to be computed once, and therefore, provides a rapid way of completely classifying a complete image.

It is to be noted that the shade classification step is optional and that a prosthesis can be manufactured using directly the RGB values. ps Translucency Determination The main difficulty of measuring translucency and color simultaneously arises from the fact that the information of these two appearance factors is usually confounded. Different approaches can be used to disambiguate these two appearance factors:

1. The auto-correlation functions for the three color channels provide information on the blur which can be caused by the translucency. Structured lighting can be used to increase and further disambiguate the signal.
2. Translucency can be evidenced by comparing successive images taken with alternately a white and a black background. A structured background can also be used to evidence transparency.
3. The knowledge of the color space covered by the material can also be used to parse color and translucency variations.

For the present application, the latter approach is possible because of the surprising two-fold observation that:

With increasing translucency, intensity decreases and the hue shifts toward blue; and While for typical tooth shade variations, an intensity decrease corresponds to hue shifting toward the red.

A translucency index is therefore determined with respect to a reference point (the most opaque region) by the product of the relative intensity variation with the red/blue relative difference. A logarithmic scale provides a perceptually more significant measure.

The reference point is the most opaque region of the tooth. It is obtained by an iterative procedure starting at a naturally opaque region determined by knowledge of the morphology of the tooth.

Given a RGB signal with n-bit of data per channel, $S(x,y)=(r(x,y),g(x,y),b(x,y))/(2^n-1)$, and a reference measure in an opaque region, $S_0=(r_0, g_0, b_0)/(2^8-1)$, a translucency index can be defined as the square root of the product of two sub-index:

$$T(x,y)=(T_1(x,y) \times T_\lambda(x,y))^{1/2} \quad (4)$$

where the translucency intensity sub-index, $T_1(x,y)$, and translucency wavelength sub-index, $T_\lambda(x,y)$, are defined as follow:

$$T_1(x,y)=\Delta I(x,y) \text{ and } T_\lambda(x,y)=\Delta R\ (x,y)-\Delta B(x,y); \quad (5)$$

where $\Delta I(x,y)=I_o-I(x,y)$; $\Delta R(x,y)=(r_o-r(x,y))/r_o$; and $\Delta B(x,y)=(r_b-b(x,y)/r_b$; with the intensity defined as the norm of the signal:

$$I(x,y)=\|S(x,y)\|, I_o=\|S_0\|. \quad (6)$$

At every point, the translucency value is based on the median over a small neighborhood of points to eliminate biases due to outliers. A translucency image map may thus be built.

Appearance Description (optional)

The teeth appearance can be described by a false color map where the difference between each shade sample is enhanced (e.g. saturation level could be raised) to clearly demarcate the transition between regions of different colors. Shade samples families can be grouped by enhancing less the color difference within family members than other shades.

The objective of this step is to create a tooth color map using the colors of the available porcelain powders or resin.

It is to be noted that the appearance description step is optional and that a prosthesis can be manufactured using directly the RGB values.

Also, it is to be noted that the illuminator assembly 14 shown in FIG. 2 could be replaced by other types of illumination.

Figure 4:
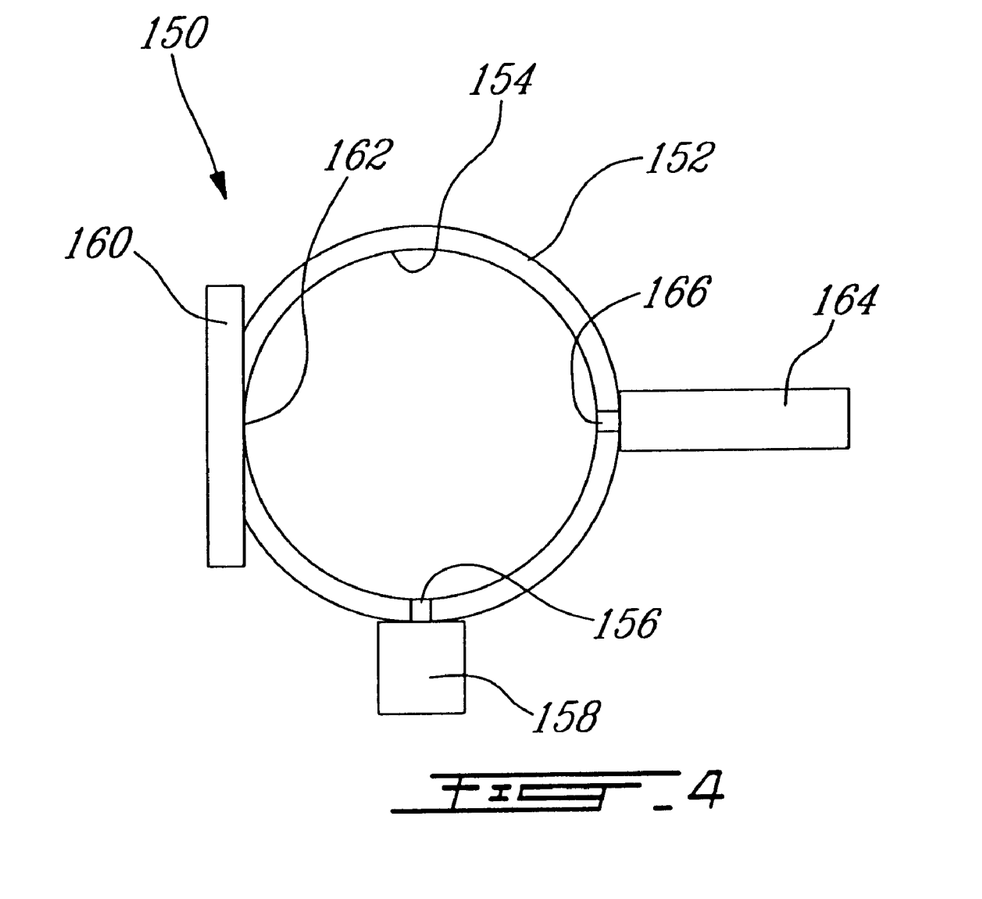
FIG. 4 is a schematic view of an integrating sphere illumination system according to an embodiment of the present invention.

For example, FIG. 4 illustrates an integrating sphere illuminator assembly 150 used to achieve a uniform diffuse light. It is to be noted that the larger the size of the sphere with respect to the aperture, the higher the precision. This type of illumination is useful for measurement of matte surface. For glossy materials, the desired signal is often confounded with a specular reflection component.

An integrating sphere 152 whose interior surface 154 reflects light incoming through an aperture 156 from a light source 158 provides an indirect diffuse illumination on a surface of an object 160 through an aperture 162. A camera 164 images directly the surface of the object 160 through an aperture 166. An alternative is to channel light from a distant source through light such as optic fibers.

Figure 5:
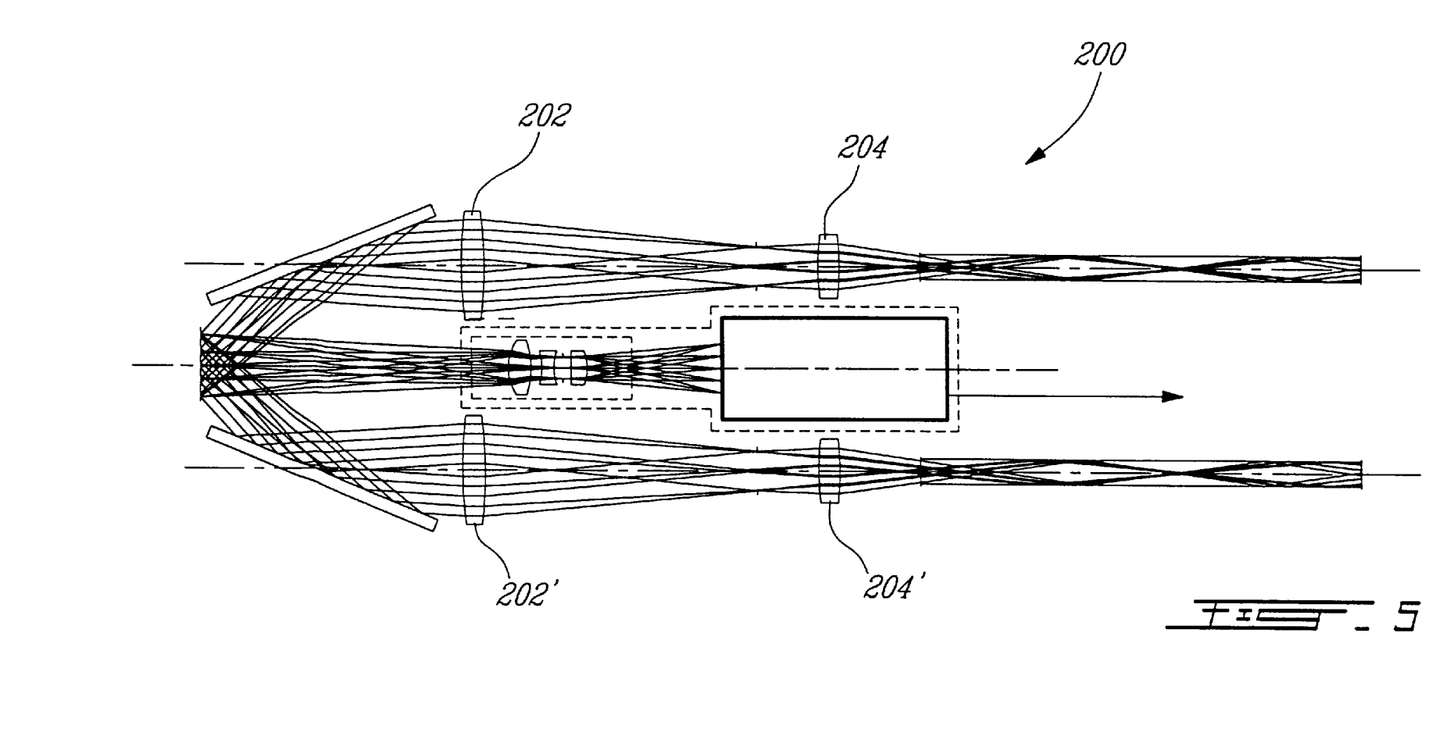
FIG. 5 is a schematic view of an illuminator assembly according to another embodiment of the present invention.

Turning now briefly to FIG. 5 of the drawings, the illuminator assembly 14 of FIG. 2 could also be replaced by other types of telecentric illuminators. For example, the illuminator assembly 200 shown in FIG. 5 produces telecentric illumination with less optical elements than the illuminator assembly 14. In this illuminator 200, a single custom made lens 202 replaces lenses 22 and 24 while a single custom made lens 204 replaces lenses 26 and 28.

Similarly the components of the CCD camera head can also be simplified as shown in FIG. 5.

As will be apparent to one skilled in the art, structured light could also be used to illuminate the object.

Of course, even though the above described apparatus and method have been described herein with respect to the measurements of the color of teeth, the color of other objects such as, for example, flesh or synthetic materials such as resin, acrylic or plastic, could advantageously be measured via the apparatus of the present invention or using the method of the present invention.

As will be apparent to one skilled in the art, the color and translucency map output of the apparatus for measuring the color of an object could be linked to a computer controlled molding apparatus that would mold a duplicate of the object according to this map.

Although the present invention has been described hereinabove by way of preferred embodiments thereof, it can be modified, without departing from the spirit and nature of the subject invention as defined in the appended claims.

What is claimed is:

1. A method for determining the appearance of an object comprising the steps of:
    illuminating a surface of the object with a controlled illumination;
    collecting, with a camera, color shade data corresponding to light rays reflected from a predetermined plurality of points on the illuminated surface of the object; and
    processing said color shade data to create at least one appearance map of the object.

2. A method as recited in claim 1, wherein said illuminating step includes the substep of supplying an illuminator assembly including at least one light generating source and at least one illumination path between said at least one light generating source and said surface.

3. A method as recited in claim 2, wherein said light generated by said light source in said illuminating step is a time varying monochromatic light.

4. A method as recited in claim 2, wherein said light generated by said light source is a white light; said white light is further modified into a time varying monochromatic light by filtering said white light.

5. A method as recited in claim 3, wherein said camera is a CCD array and said color shade data is a series of measurements of said surface of the object as the wavelength of said monochromatic light varies in time.

6. A method as recited in claim 5, wherein said selected wavelengths varies across the full visible spectrum.

7. A method as recited in claim 5, wherein said CCD camera is provided with three sampling bands and said color shade data processing step further includes the substep of using said series of measurements to produce three samples of the light spectrum.

8. A method as recited in claim 7, wherein said color shade data processing step further includes the substep of using said three samples of light spectrum and a linear transform to compute tristimulus values.

9. A method as recited in claim 1, wherein said color shade data processing step further includes the substep of performing a shade classification; said shade classification substep including the substeps of:
    sampling color pixel values from shade tabs to produce a shade guide; and
    comparing said color shade data to shade guide to determine a shade value for at least one of said plurality of points on said illuminated surface of the object .

10. A method as recited in claim 9 wherein said shade guide is in the form of a lookup table.

11. A method as recited in claim 9, wherein said shade tab colors correspond to the colors of one of known ceramic powder, resin and composite.

12. A method as recited in claim 1, wherein said at least one appearance map is a shade map.

13. A method as recited in claim 1, wherein said at least one appearance map is a translucency map; said translucency map including at least one translucency index.

14. A method as recited in claim 13, wherein said at least one translucency index being determined with respect to a reference point; said reference point being one of said predetermined plurality of points.

15. A method as recited in claim 14, wherein said reference point is from an opaque region of the object.

16. A method as recited in claim 14, wherein said reference point is obtained by an iterative procedure.

17. A method as recited in claim 14, wherein said at least one translucency index is based on the median over a plurality of translucency values; said plurality of translucency values calculated from the value of neighbouring points.

18. A method as recited in claim 1, wherein said color shade data processing step further includes the substep of processing said color shade data to obtain a false color map.

19. A method as recited in claim 18, wherein said false color map includes at least one color corresponding to the color of a known porcelain powder.

20. A method as recited in claim 18, wherein said false color map includes at least one color corresponding to the color of a known resin.

21. A method as recited in claim 1, further comprising the step of calibrating said camera before said color shade data processing step.

22. A method as recited in claim 21, wherein calibration of said camera consists of measuring a first calibration target having known color shade values and inferring a mathematical transform to convert the measured color shade values into said known color shade values of said first calibration target.

23. A method as recited in claim 22, wherein said first calibration target is a plurality of patches of known color shades and translucencies.

24. A method as recited in claim 22, wherein said calibrating step further includes a spatial correction substep; said spatial correction substep consisting in measuring a second calibration target having a uniform color shade and to compute and apply a mathematical spatial correction function to compensate for measured spatial variations.

25. A method as recited in claim 21, further comprising the step of verifying the calibration after said data collecting step.

26. A method as recited in claim 1, wherein the object is selected from the group consisting of a tooth, flesh and synthetic materials.

27. A method as recited in claim 26, wherein said synthetic material is selected from the group consisting of resin, acrylic and plastic.

28. An apparatus for determining the color of an object, said apparatus comprising;
an illuminator assembly to produce a controlled illumination onto a surface of the object; said illuminator assembly including at least one light generating source and at least one illumination path between said at least one light source and said object to project said generated light on the object;
a camera to collect light reflected from a plurality of points on the surface of the illuminated object; said camera producing a first set of data consisting of a spectral image map of the illuminated surface of the object;
a controller to control said at least one light source and said camera and to process said first set of data to create at least one appearance map of the illuminated surface of the object.

29. An apparatus as recited in claim 28, wherein said light source is configured to produce light from selected wavelengths.

30. An apparatus as recited in claim 28, wherein said at least one illumination path is a telecentric optical system.

31. An apparatus as recited in claim 30, wherein said telecentric optical system further includes a mirror to project said light at an angle on said surface of the object.

32. An apparatus as recited in claim 28, wherein said camera is a CCD camera.

33. An apparatus as recited in claim 28, further comprising an output device selecting from the group consisting of a display monitor, a disk drive, a CD-drive, a computer memory, a printing device, a frame grabber data acquisition board and a molding apparatus.

* * * * *